US011740022B2

(12) United States Patent
Lawrence et al.

(10) Patent No.: US 11,740,022 B2
(45) Date of Patent: Aug. 29, 2023

(54) FURNACE CONTROLLER AND METHOD OF OPERATING A FURNACE

(71) Applicant: Air Products and Chemicals, Inc., Allentown, PA (US)

(72) Inventors: Martin Lawrence, Nantwich (GB); Avishek Guha, Allentown, PA (US); Reed Jacob Hendershot, Orefield, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 343 days.

(21) Appl. No.: 16/935,248

(22) Filed: Jul. 22, 2020

(65) Prior Publication Data

US 2022/0026147 A1    Jan. 27, 2022

(51) Int. Cl.
*F27B 3/28* (2006.01)
*F27D 19/00* (2006.01)
(Continued)

(52) U.S. Cl.
CPC .................. *F27B 3/28* (2013.01); *F27B 7/42* (2013.01); *F27B 14/20* (2013.01); *F27D 19/00* (2013.01); *C22B 7/00* (2013.01); *C22B 7/001* (2013.01); *C22B 13/025* (2013.01); *C22B 15/003* (2013.01); *C22B 21/00* (2013.01); *F27B 9/28* (2013.01); *F27D 21/00* (2013.01); *F27D 2019/0003* (2013.01); *F27D 2019/0006* (2013.01); *F27D 2019/0028* (2013.01); *F27D 2019/0087* (2013.01); *Y02P 10/20* (2015.11)

(58) Field of Classification Search
CPC ......... C03B 3/026; C03B 5/225; C03C 1/002; C22B 1/005; C22B 7/00; C22B 7/001; C22B 7/003; C22B 15/003; C22B 21/00; C22B 21/0092; F27B 3/28; F27B 7/42; F27B 9/28; F27B 14/20; F27D 19/00
USPC .......................................................... 432/1
See application file for complete search history.

(56) References Cited

U.S. PATENT DOCUMENTS

| 3,719,469 A | 3/1973 | Roessing |
| 4,484,947 A | 11/1984 | Marshall |
| 2019/0360067 A1* | 11/2019 | Gangoli .............. C22B 21/0092 |

FOREIGN PATENT DOCUMENTS

| WO | 2012019027 A1 | 2/2012 |
| WO | WO-2019115655 A1 * | 6/2019 |

(Continued)

*Primary Examiner* — Steven B Mcallister
*Assistant Examiner* — Benjamin W Johnson
(74) *Attorney, Agent, or Firm* — Matthew Richard Weaver

(57) ABSTRACT

A control scheme for a furnace can use real-time and historical data to model performance and determine relationships between different data and performance parameters for use in correcting suboptimal performance of the furnace in real-time. Operational parameters can be logged throughout the cycle for all cycles for a period of time in order to establish a baseline. This data can then be used to calculate the performance of the process. A regression analysis can be carried out in order to determine which parameters affect different aspects of performance. These relationships can then be used to predict performance during a single cycle in real-time and provide closed or open loop feedback to control furnace operation to result in enhanced performance.

12 Claims, 8 Drawing Sheets

(51) Int. Cl.
*F27B 7/42* (2006.01)
*F27B 14/20* (2006.01)
*F27B 9/28* (2006.01)
*F27D 21/00* (2006.01)
*C22B 7/00* (2006.01)
*C22B 13/02* (2006.01)
*C22B 15/00* (2006.01)
*C22B 21/00* (2006.01)

(56) References Cited

FOREIGN PATENT DOCUMENTS

| WO | 2019216975 A1 | 11/2019 | |
| WO | WO-2019216975 A1 * | 11/2019 | ......... B62D 15/0215 |

* cited by examiner

FURNACE CONTROLLER AND METHOD OF OPERATING A FURNACE

FIELD OF THE INVENTION

The present innovation relates to controllers that are configured to facilitate control of operations of furnaces operated to melt metal containing materials and methods of making and using the same.

BACKGROUND OF THE INVENTION

Secondary metals recycling and reprocessing processes can involve melting of metal scrap from varied sources and upstream processes. The scrap being recycled often varies considerably in shape, size, and composition. This high degree of inconsistency in the input scrap material must be accommodated in the melting process. Consequently, the energy needs of a melting furnace used in metals recycling or reprocessing can change frequently, often from melt to melt. This can result in a high degree of variability in the operational efficiency and productivity of a melt furnace. When operators are handling multiple melt furnaces at the same time, the penalties from process variability can be amplified.

Examples of secondary metal recycling processes can be appreciated from U.S. Pat. No. 4,484,947 and U.S. Pat. App. Pub. No. 2019/0360067. U.S. Pat. No. 4,484,947 relates to control of an aluminum melting process in an enclosed hearth by measuring certain temperatures in the furnace and adjusting the firing rate of a burner to rapidly melt the aluminum. U.S. Pat. App. Pub. No. 2019/0360067 discloses a system for controlling a melting process in a melting furnace.

SUMMARY

We have determined that there can be considerable variability in secondary remelting processes or recycling processes for metal (e.g. a secondary aluminum remelting/recycling process, a secondary copper remelting/recycling process, secondary steel remelting or recycling processes, secondary lead remelting or recycling processes, secondary iron remelting or recycling processes, etc.). This can include dross materials, recycled metal (e.g. aluminum), and metal for remelting (e.g. aluminum, copper, iron, lead or steel, for remelting, etc.). We have determined that there is a significant amount of variability from charge material, to furnace condition, through to operations. These sources of variability can introduce a significant amount of uncertainty into the process, leading to a large spread in performance results.

For instance, charge materials typically include different types of scrap, drosses and metallics, which can all range in size, shape and composition. Fluxes (salts) are also often added to the charge material, which can vary in composition and amount. Certain types of charge materials, such as drosses, can vary in composition in unknown amounts from batch to batch (or cycle to cycle) due to the nature of how they are produced. Therefore, a single type of dross material from a particular origin may still contain different amounts of a metal (for example, 30-50 wt. % aluminum), creating further unknown or unaccounted for variability in material input.

We have determined that furnace condition can be used to describe various furnace parameters, such as furnace type and state, which can all significantly affect performance. The furnace type can include furnace design, such as rotary, reverb, side well, twin chamber, etc, along with furnace configuration, e.g. single or double pass, burner fuel type, percentage oxygen in the oxidizer, flue configuration, burner design, burner installation details including angle, and rated furnace size, etc. We have determined that the state of the furnace can be described by its temperature, cleanliness, refractory type and condition, door condition (insulation and seal), how full the furnace is for a given cycle, materials of construction (affecting heat transfer), ambient conditions around the furnace, including neighboring operations, and how well sealed the furnace is. The furnace operation (which can vary during the cycle) can include a number of parameters that can include, for example, burner firing rate, changes to burner operation (e.g. staging), any variability in the fuel or oxidant composition, flue temperature, furnace pressure, furnace rotation speed and direction, tilt angle, furnace rotation motor current or hydraulic pressure, door position, operator, operator shift, slag and the extent of metal oxidation (e.g. aluminum oxidation) at any point during the cycle.

We have also determined that secondary metal remelting (e.g. aluminum remelting, copper remelting, steel remelting, etc.) can rely on operator decisions and judgement to identify when the material inside the furnace has reached a suitable tapping temperature. Conventionally, there is no consistent and accurate method for identifying when the metal is ready for tapping. Often, operators look for particular characteristics of the furnace or operation, such as appearance of the furnace walls, effluent or charge material, which can be ambiguous and dependent on operator experience. We have determined that the variability in the process and ambiguity of operator decision-making can often lead to inconsistent furnace performance.

A mass and energy balance model can be used for calculating when the material inside a furnace is ready for tapping ('end of melt' calculation). One example of such a calculation methodology is described in U.S. Pat. App. Pub. No. 2019/0360067. We have determined that this methodology can be prone to a certain amount of error depending on the charge materials used. For example, individual dross materials that have a range of aluminum content can lead to errors when calculating the energy required for aluminum melting, which has to be accounted for. For instance, if the average aluminum content from a particular dross was 50%, but the range of the aluminum content was 40-60%, then the actual aluminum content could be anywhere within the range. For a charge weight of 10 metric tonnes, the theoretical energy required to melt the material with 40, 50 and 60% aluminum content (assuming the remaining material is aluminum oxide) are approximately 7,840 megajoules (MJ), 8,260 MJ and 8,680 MJ respectively. Therefore if the mass and energy balance calculation assumes an average aluminum content of 50%, the calculated required energy could be +/−5% or a total potential range of up to about 10%. We have determined that the consequences of this type of error could be that at the end of the melting cycle, if following the required energy calculation based on initial estimates of mass and composition, the charge material is either too cold or too hot (i.e. under-heated or overheated). For example, if the charge is under-heated for operations with aluminum, then the aluminum may not have absorbed sufficient energy to become completely molten, which could significantly reduce the aluminum recovery. On the other hand, if the charge is overheated, then the aluminum may have absorbed too much energy and therefore become significantly hotter than required. This can also affect aluminum recovery, as higher temperature aluminum oxidizes more readily. Cycles that are overheated also use more time and energy than required, thereby reducing productivity and increasing energy consumption and hence, carbon emissions.

We have developed a controller and system that can utilize a control method for furnace operations that can address the above mentioned problems that we have identified. Embodiments of our controller, system, and method can take into account charge material variability by providing a real-time correction calculation based on historical and live data. Embodiments can be utilized in conjunction with the recycling of metal such as, for example, the processing of dross materials, recycled aluminum, aluminum for remelting, melting of metals, melting of metal containing materials, recycling of a metal, and remelting of a metal containing material. For example, in some embodiments that may process dross materials, the processing of the material can include separating the oxide portion of the dross material from a metal component of the dross material by melting a metal component of the dross material and subsequently separating the oxide portion of the dross material (which may still be in solid form even though metal of the dross material may be melted into a liquid state or a molten state) from the metal material. The metal material may then be poured into a vessel or other form for solidification and/or transport for use of that metal in another type of process (e.g. manufacturing, etc.) For some other embodiments that may process metal containing material, the process can include remelting a metal containing material for recycling of the metal of that material or for some other end use of the metal of the material.

In some embodiments, a control scheme for a furnace that can be utilized by a controller can make use of real-time and historical data to model performance and determine relationships between different data and performance parameters for use in correcting suboptimal performance of the furnace in real-time (e.g. within seconds, within minutes, within a few minutes, within 5-10 minutes, within a time period that is up to 15 minutes). Embodiments of the controller can be configured for use in an open loop control scheme or a closed loop control scheme. Embodiments of the controller can be provided for use via a cloud based service that utilizes at least one internet connection (e.g. the internet and/or at least one enterprise network) or a more local based service in which the controller is positioned within the same network as components of the furnace (e.g. within the same local network via a wired and/or wireless communication network, local area network, etc.).

Operational parameters can be logged throughout the cycle for all cycles for a period of time for storage in memory of the controller in order to establish a baseline set of data. This baseline set of data can then be used by the controller to calculate the performance of the process. The controller can be configured to perform a regression analysis in order to determine which parameters affect different aspects of performance. These relationships can then be used to predict performance during a single cycle in real-time and provide closed or open loop feedback to control furnace operation to enhance the performance of the furnace and make operation of the furnace more profitable. For example, at least one parameter that significantly affects aluminum oxidation can be identified from the development of at least one reference model and the identified one or more parameters can be modified by changing operational parameters in real-time to reduce aluminum oxidation for furnace operations in which aluminum is being melted. Embodiments of the control scheme utilized by the controller can also be applied to other types of metals to be melted via a furnace, such as those containing iron, lead and/or copper and to different types of furnaces, including, for example, reverbs, twin chamber and side well furnaces.

Embodiments of a method for controlling operation of a furnace to melt a material that includes metal (e.g. a material containing metal). The method can include: storing data related to the charge material, furnace condition and operation data for the furnace for a plurality of different cycles of operation of the furnace in a non-transitory computer readable medium of a computer device; creating or determining one or more cycle performance parameters based on the stored data; creating a historian data store based on the stored data parameters and the cycle performance parameters; determining x-variables for the one or more cycles of operation of the furnace and feeding the x-variables into a regression model to determine a relationship between at least one of the x-variables with at least one y-variable to define at least one reference cycle, each y-variable corresponding to a respective one of the cycle performance parameters; receiving real-time data from sensors of the furnace; comparing the real-time data from the sensors of the furnace to the at least one reference cycle to determine whether an adjustment to one or more furnace operational parameters is needed; and upon determining that a difference from the at least one reference cycle exists that meets or exceeds a significance threshold based on the comparing of the real-time data from the sensors of the furnace to the at least one reference cycle, adjusting operation of the furnace so that operation of the furnace is adjusted to converge toward a pre-selected furnace performance.

The pre-selected furnace performance can be defined by the at least one reference cycle in some embodiments of the method. The at least one reference cycle can be a desired operation of the furnace that may be based on model for that was derived with the help of historical data of the furnace's past performance. Such historical data can be stored in a historian data store that includes empirical data related to past operational cycles of the furnace melting material that includes a metal. In some embodiments, the reference cycle can be considered a best performance operational profile of the furnace. In other embodiments, the reference cycle can be a pre-selected furnace performance objective that is based on historical operational data of the furnace of a furnace having a similar configuration (e.g. same or similar furnace model melting similar type of material, etc.).

Embodiments of the method can include other steps as well. For instance, the method can include generating the at least one reference cycle. The generating of the at least one reference cycle can include characterizing the cycles into one or more material groups for generation of the at least one reference cycle for a desired performance of the furnace.

The determining of the x-variables for the one or more reference cycles can include removing outlier data from the material groups before feeding the data parameters to the regression model.

In some embodiments, the at least one y-variable can include a first y-variable for specific fuel consumption, a second y-variable for melt rate and a third y-variable for yield. In other embodiments, there may just be a single y-variable, only two y-variables, or more than three y-variables. In some embodiments, the one or more y-variables can include at least one of specific fuel consumption, melt rate and yield or a combination of these variables.

The at least one reference cycle for each y-variable can be determined by identifying one or more best case cycles of operation of the furnace. The best case cycles of performance can be derived from historical data stored in a historian data store and/or other data. In some embodiments, the best case cycle of performance can be derived from historical data of the furnace and further modified to define a best case cycle of performance. The modification can be provided via one or more models used in conjunction with the historical data of past furnace operations for past cycles of operation of the furnace and/or past operations of a similar type of furnace.

In some embodiments, the at least one reference cycle is a single best reference cycle. In other embodiments, the at least one reference cycle includes multiple best reference cycles that are defined based on the charge material to be fed to the furnace. Each reference cycle can be an average of best case cycles of furnace operation for a particular type of charge material.

The regression model can be configured to determine the relationship between x-variables and y-variables and can also be used to identify insignificance x-variables so that the insignificant x-variables are removable for development of at least one reference cycle and/or other analysis.

Real-time data from the sensors of the furnace can include charge material data, furnace condition data and operational data. The real-time data can be real-time data if the data is within seconds, within minutes, within ten minutes, or within 15 minutes of a current time at which the furnace is operating. In some embodiments, the real-time data can be data that is up to 15 minutes or 20 minutes of a current time of furnace operation. In other embodiments, the real-time data can be data that is up to 1 minute or up to 3 minutes of a current time of furnace operation. The latency of a network environment or system environment can affect how close the real-time data may be to a current time of operation of the furnace.

The method can also include communicating data for adjusting operation of the furnace to a computer device of an operator so that the operation of the furnace is adjusted to converge toward the furnace performance defined by the at least one reference cycle so operation of the furnace is adjusted to converge toward a desired performance of the furnace. In other embodiments, the communication of data for adjusting operation of the furnace can be automatically supplied in a way for immediate implementation without operator approval of the change(s). In some embodiments, adjusting of the operation of the furnace so that operation of the furnace is adjusted can include communicating data for the adjusting of the operation of the furnace to a first computer device operatively connected to the furnace so that the operation of the furnace is adjusted.

Embodiments of a non-transitory computer readable medium having a program stored thereon is also provided. The program can define a method that is performed by a computer device that runs the program. The method can include (i) storing data related to charge material for a furnace, furnace condition and operation data for the furnace for a plurality of different cycles of operation of the furnace; (ii) creating or determining one or more cycle performance parameters based on the stored data; (iii) creating a historian data store based on the stored data parameters and the cycle performance parameters; (iv) characterizing the cycles for generation of one or more reference cycles; (v) determining x-variables for the one or more reference cycles and feeding the x-variables into a regression model to determine a relationship between at least one of the x-variables with at least one y-variable to define at least one reference cycle, each y-variable corresponding to a respective one of the cycle performance parameters; (vi) receiving real-time data from sensors of the furnace when the furnace is operating to melt charge material; (vii) comparing the real-time data from the sensors of the furnace to the at least one reference cycle to determine whether an adjustment to one or more furnace operational parameters is needed; and (viii) upon determining that a deviation from the at least one reference cycle exists based on the comparing of the real-time data from the sensors of the furnace to the at least one reference cycle, adjusting operation of the furnace so that operation of the furnace is adjusted to converge toward a pre-selected furnace performance objective.

Embodiments of the method defined by the program or code of the program can include an embodiment of the method discussed above or elsewhere herein. For example, in some embodiments, the regression model can determine the relationship between x-variables and y-variables and is also used to identify insignificance x-variables so that the insignificant x-variables are removed from analysis. As another example, the method defined by the program can also include communicating data for the adjusting operation of the furnace to a computer device of an operator so that the operation of the furnace is adjusted to converge toward the furnace performance defined by the at least one reference cycle.

As another example, the pre-selected furnace performance objective can be defined by the at least one reference cycle. As discussed above, the pre-selected furnace performance can be defined by the at least one reference cycle in some embodiments. The at least one reference cycle can be a desired operation of the furnace that may be based on model for that was derived with the help of historical data of the furnace's past performance. Such historical data can be stored in a historian data store that includes empirical data related to past operational cycles of the furnace melting material that includes a metal. In some embodiments, the reference cycle can be considered a best performance operational profile of the furnace. In other embodiments, the reference cycle can be a pre-selected furnace performance objective that is based on historical operational data of the furnace of a furnace having a similar configuration (e.g. same or similar furnace model melting similar type of material, etc.).

A system for controlling melting of a charge material via a furnace is also provided. The system can be configured to implement an embodiment of the method and/or utilize an embodiment of the non-transitory computer readable medium. In some embodiments, the system can include a computer device communicatively connected to sensors of a furnace to obtain measurement data during operation of the furnace. The computer device can be configured to store data related to charge material, furnace condition and operation data for the furnace for a plurality of different cycles of operation of the furnace in a non-transitory computer readable medium communicatively connected to a processor of the computer device. The computer device can also be configured to create or determine one or more cycle performance parameters based on the stored data, create a historian data store based on the stored data parameters and the cycle performance parameters, and generate one or more reference cycles. The computer device can also be configured to determine x-variables for the one or more reference cycles and feed the x-variables into a regression model to determine a relationship between at least one of the x-variables with at least one y-variable to define at least one reference cycle. Each y-variable can correspond to a respective one of the cycle performance parameters. The computer device can also be configured so that, upon determining that a deviation from the at least one reference cycle exists based on a comparison of real-time data from the sensors of the furnace to the at least one reference cycle, the computer device initiates adjustment of operation of the furnace so that operation of the furnace is adjusted to converge toward a pre-selected furnace performance.

In some embodiments of the system, the computer device can be considered a first computer device. This first computer device can be communicatively connected to a computer device of an operator (which can be considered a second computer device). The first computer device can initiate adjustment of operation of the furnace so that operation of the furnace is adjusted to converge toward furnace performance defined by the at least one reference cycle by sending a communication to the computer device of the operator. The communication can facilitate input entered by the operator to have one or more operational parameter adjustments changed. In other embodiments, this communication can be sent so that the change occurs automatically without requiring operator input.

In some embodiments, the computer device can be configured to adjust at least one control parameter for the furnace to initiate adjustment of operation of the furnace so that operation of the furnace is adjusted to converge toward the pre-selected furnace performance. As discussed above, the pre-selected furnace performance can be defined by the at least one reference cycle. For example, the pre-selected furnace performance can be defined by the at least one reference cycle in some embodiments. The at least one reference cycle can be a desired operation of the furnace that may be based on model for that was derived with the help of historical data of the furnace's past performance. Such historical data can be stored in a historian data store that includes empirical data related to past operational cycles of the furnace melting material that includes a metal. In some embodiments, the reference cycle can be considered a best performance operational profile of the furnace. In other embodiments, the reference cycle can be a pre-selected furnace performance objective that is based on historical operational data of the furnace of a furnace having a similar configuration (e.g. same or similar furnace model melting similar type of material, etc.).

Embodiments of the system can also include other components. For instance, the system can include the furnace and/or the sensors of the furnace. The system can also include other elements such as, for example, one or more program logic controllers for the furnace and/or one or more network nodes (e.g. router, gateway access point, bridge, etc.) connecting the furnace sensors to the computer device for communication of sensor data to the computer device, etc.

Other details, objects, and advantages of our controller for furnaces, systems utilizing the controller and methods of making and using the same will become apparent as the following description of certain exemplary embodiments thereof proceeds.

BRIEF DESCRIPTION OF THE DRAWINGS

Exemplary embodiments of our system for controlling operations of a furnace, a controller for furnaces, and methods of making and using the same are shown in the drawings included herewith. It should be understood that like reference characters used in the drawings may identify like components. For instance, in certain drawings, the term "Temp." refers to temperature.

DETAILED DESCRIPTION

Figure 1:
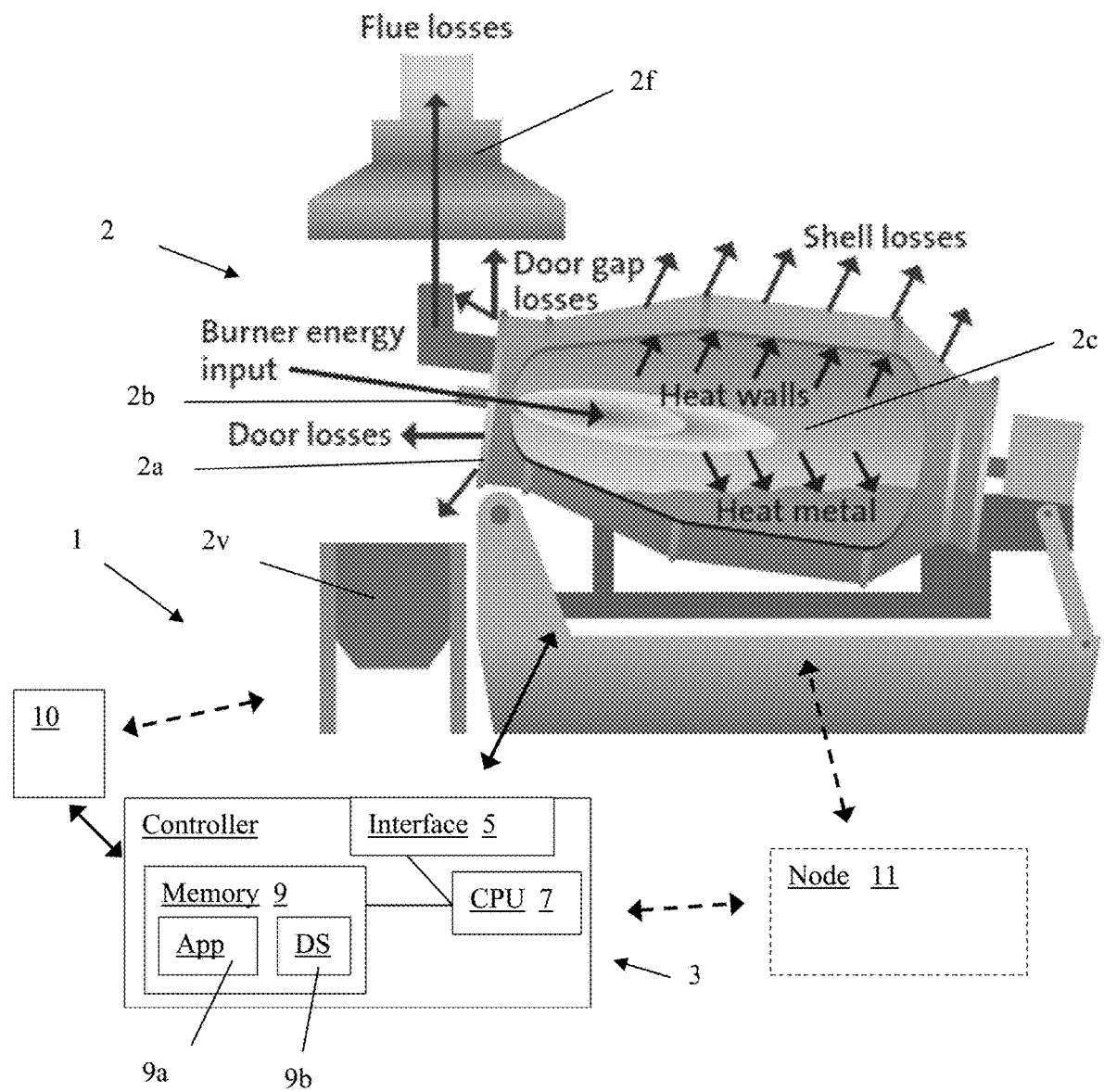
FIG. 1 is a schematic view of a first exemplary embodiment of a system for controlling operations of a furnace. An intermediate node 11 and communication connections between the intermediate node 11 and the controller 3 and the computer device 10 and the furnace 2 (e.g. furnace sensors and programmable logic controllers of the furnace, etc.) are shown in broken line in FIG. 1.

Referring to FIGS. 1-8, a system 1 for controlling operations of a furnace 2 can include a controller 3 that is communicatively connected to sensors of the furnace that collect data related to various operational parameters of the furnace. In some embodiments, the controller 3 can be a computer device that is communicatively connected to a plurality of sensors and one or more program logic controllers (PLC) or other type of controllers that are connected to the furnace to control operations of the furnace.

The controller 3 can be directly connected to the PLCs or other controllers via directed wired and/or wireless connection or can be indirectly connected via one or more intermediate nodes 11 included within a network connection (e.g. an internet connection, a local area network connection, a wireless local area network connection, etc.). For instance, the controller 3 can be a remote cloud based controller 3 connected via an internet connection in which there is at least one type of intermediate node 11 that facilitates the communication connection between the controller 3 and one or more PLCs of the furnace 2 as well communicatively connecting the controller 3 to one or more sensors of the furnace 2. Each intermediate node 11 can be a bridge, a router, an access point, a gateway, or other type of intermediate node. There may be one or more such intermediate nodes that facilitate the communication connection via a network connection. In some embodiments, an intermediate node 11 can be configured to collect sensor data from the sensors of the furnace and then provide that data to the controller 3. Such data collection and transmission can occur periodically (e.g. every few seconds, every minute, at least once every 5-10 minutes, etc.). The controller 3 can then utilize that sensor data for providing one or more control messages to one or more of the PLCs and/or a computer device 10 of an operator to facilitate adjustment of furnace operations when the controller 3 determines that an adjustment is warranted.

In other embodiments, the controller 3 can be a computer device that is within the same enterprise network of the furnace sensors, PLCs or other controllers for communicative connection to the controllers and sensors. In this type of arrangement, there may still be one or more intermediate nodes 11 involved to facilitate such a network connection. The intermediate nodes 11 can include one or more routers, access points, or other type of network node elements of the local area network.

In some embodiments, the controller 3 can be communicatively connected to a computer device 10 of an operator that uses computer 10 to oversee and/or monitor furnace operations. The controller 3 can communicate with the computer device 10 of the operator to communicate information for operational adjustment of the furnace to be implemented by the computer device 10 and/or the operator. For instance, the controller 3 can send one or more messages to the operator computer device 10 to suggest changes to one or more operational setpoints in an open loop control scheme implementation for the operator to utilize to actuate a change to one or more setpoints. Such a communication connection between the controller 3 and the operator computer device 10 can be facilitated via at least one application programming interface (API) and/or other communicative connection interfaces. The message sent to the operator computer device 10 can be configured to function in conjunction with an automated process control program running on the operator's computer device 10 in some embodiments to allow the operator to easily adjust setpoints as may be recommended in the message sent by the controller 3. One or more graphical user interfaces displayed via the operator's computer device 10 can facilitate display of one or more messages that may be sent by the controller to facilitate entrance of operator input for accepting one or more suggested adjustments to furnace operation that can be communicated by the controller 3.

The furnace can include a door 2a that can be opened and closed. The door 2a can be moved between a fully closed position and a fully open position. The door 2a can also be moved to a partially open position for pouring out material and/or feeding charge material into the chamber of the furnace. For instance, the door 2a can be fully opened or at least partially opened so that charge material can be positioned in the chamber of the furnace for being melted in the chamber of the furnace. The door 2a can be closed to enclose the chamber 2c for melting of the metal. The door 2a can be fully opened or at least partially opened to open the chamber for pouring melted metal out of the chamber of the furnace and into at least one vessel 2v.

The furnace 2 can also include a flue 2f through which combustion gases may exit the furnace chamber when the material within the chamber is being heated via at least one burner 2b. The burner(s) 2b of the furnace can be configured to combust a fuel via air or other type of gas flow that includes oxygen being fed to the burner for heating metal and other material within the chamber to melt the material (e.g. metal to be melted). The flue 2f can be in fluid communication with the chamber so that hot combustion gases can be exhausted from the chamber. One or more flue gas treatment mechanisms can be connected to the flue for receiving the flue gas for treating that gas before it is exhausted from the furnace and/or recycled to the furnace as a component of the combustion gas etc.

The sensors of the furnace 2 can include temperature sensors, pressure sensors, compositional detection sensors, operational parameter sensors (e.g. flow rate of flue gas, composition of flue gas, temperature of flue gas, composition of the flue gas, etc.). The controller 3 can be communicatively connected to the sensors via a wired connection and/or wireless communication connection. In some embodiments, the controller can be directly connected to one or more sensors via wiring and an interface 5 of the controller. The controller 3 can also, or alternatively, be communicatively connected to some or all of the sensors via at least one network. In some embodiments, an intermediate node 11 can store the sensor data and then periodically transmit that data to the controller 3 or it can immediately transfer the data to connect the controller 3 to the sensors. In some embodiments, there may be one or more intermediate nodes 11 between the sensors and the controller that facilitate communication of sensor data to the controller 3 for storage in the memory of the controller 3 or in memory that is accessible to the controller 3 (e.g. memory of a server that can be connected to the controller 3). The controller 3 and sensors can be communicatively connected via at least one network (e.g. local area network, the internet, an enterprise network, etc.).

The controller 3 can be a computer device such as, for example, a controller device, a workstation, a server, an array of servers hosting a furnace control service, a desktop computer, a laptop computer, or other type of computer device. The controller 3 can be on-site with the furnace 2 or may be located remote from the furnace and be connected via remote communicative connections to the furnace sensors and other data input mechanisms (e.g. a cloud based service connectable via the internet, a network based service connectable via a wide area network connection, etc.).

The controller 3 can include hardware that includes at least one interface 5 and non-transitory memory 9 that are connected to at least one processor (CPU) 7. The processor 7 can be a central processing unit, at least one core processor, or other type of hardware processor element. The memory 9 can be flash memory, a hard drive, a solid state drive, or other type of memory. Each interface 5 can be configured to facilitate communication connections (e.g. include a wireless network adapter, an Ethernet network adapter, a near field communication adapter, a Bluetooth adapter, and/or at least one network interface card (NIC), etc.).

The memory 9 can have at least one application (App) 9a and at least one data store 9b stored thereon (also referred to as at least one data store "DS" in the drawings). The data store(s) 9b can include data collected from one or more of the sensors over time, program functions, files of data, data libraries, a database containing sensor data, and/or other information. The application 9a can include instructions that define a method that can be performed by the controller 3 when the processor 7 runs the application. The application can include code that requires the processor 7 to utilize information included in the one or more data stores 9b when running the application 9a. In some embodiments, the controller 3 can be a server that hosts a cloud-based furnace control service for communication to one or more computer devices 10 of a process control system that may monitor and/or oversee control operations of the furnace. In other embodiments, the controller 3 can be incorporated into or be a computer device of a more locally present automated control system.

The controller 3 can include or be connected to a display device or a computer device 10 having a display device (e.g. laptop computer having a display, workstation having a display, a tablet having a touch screen display, etc.). Data generated by the controller 3 can be communicated to the computer device 10 having the display for generation of a graphical content to display in a user interface to display data to a user (e.g. an operator) that can be used by the user to monitor furnace operations and/or oversee operations of the furnace. In some embodiments, the computer device 10 can be part of a workstation that runs an automated process control program for overseeing and/or monitoring operations of the furnace 2 and the computer device 10 can display a graphical user interface that incorporates the data received from the controller 3 for display of at least a portion of this data in a particular type of graphical element or display element to communication relevant data about furnace operations to a user for the user to use in monitoring and/or adjusting operations of the furnace (e.g. identifying a desired tapping time, adjusting temperature setpoint of the furnace, etc.). The controller 3 can also be configured to communicate data to other communication devices (e.g. desktop computers, laptop computers, smart phones) to provide data related to furnace operations. In some embodiments, the controller 3 can communicate with the computer device 10 of an operator or other personnel via at least one application programming interface (API) or other type of interface for communication of such data.

The controller 3 can be configured to receive data from the sensors and store that data for a pre-selected period of time in at least one data store 9b to store a baseline set of data for a pre-selected number of cycles of operation of the furnace 2. Some of the data that is obtained can also be from non-sensor devices, such as from a manual input of data provided by a user using an input device or from a computer device connected to a scale that may be used to detect the weight of material to be fed to a furnace. In some embodiments, this baseline set of data can be stored in at least one data store 9b by copying data from furnace operations stored in an automated process control system that may have overseen prior cycles of the furnace's operation so that this baseline set of data is stored and accessible to the controller without any delays in situations where the controller 3 is being installed for use with a pre-existing furnace 2. In yet other embodiments, the baseline set of data can include data that is based off of model furnace measurement data collected from similar type furnace uses that is believed to be applicable to the furnace 2 that the controller 3 is to be used for. Once this baseline set of data is in memory that is accessible to the controller (e.g. memory of the controller or memory of a workstation, database server, or other device communicatively connected to the controller 3 so that the controller can access that data), the controller can be placed in an active state for monitoring and/or controlling furnace operations.

The data that is stored in the memory accessible to the controller 3 can include data from sensors as well as other sources related to a large number of parameters that may fall into a plurality of different categories. These categories can include, for example, charge material, furnace condition, and operation, as may be appreciated from FIG. 2. The operational data can be operation data obtained at any point during the cycle of the continuous operation of the furnace or during the batch or semi-batch processing of the furnace 2. This sensor data as well as other data for these categories can include all of the following or a selected sub-set of the following:

I. Charge Material:
    a. Type (e.g. scrap, dross, metallics, flux);
    b. Weight/mass;
    c. Origin;
    d. Size and shape (e.g. volume, surface area, length, width, diameter, etc.); and
    e. Composition (e.g. weight % of particular type of metal, weight % of different elements of the charge material, etc.).

II. Furnace Condition
    a. Type (e.g. rotary, reverb, side well, twin chamber, etc.);
    b. Configuration (e.g. single pass, double pass, etc.);
    c. Materials of construction (e.g. refractory type, thickness, etc.);
    d. Door (e.g. type, size, shape, location, number);
    e. Flue (e.g. type, size, shape, location, number);
    f. Burner (e.g. type, size, location, orientation, fuel type, percentage oxygen in the oxidizer, number, etc.); and
    g. State (e.g. temperature, cleanliness, refractory condition, door condition, how full the furnace is, ambient conditions, sealing efficacy, etc.)

III. Operation
    a. Burner firing rate (high, medium, low, off);
    b. Stoichiometric ratio;
    c. Flue temperature (e.g. measured, corrected for inaccuracies etc.) and control (e.g. damper or filter plant/baghouse settings, etc.);
    d. Furnace rotation speed and direction (clockwise, counter clockwise, rotational speed in revolutions per second or revolutions per minute or in other unit such as m/s etc.);
    e. Tilt angle;
    f. Furnace drum rotation resistance (e.g. motor current, hydraulic pressure);
    g. Furnace pressure;
    h. Door position;
    i. Operator and shift;
    j. Slag (weight, condition, temperature); and
    k. Variability in fuel or oxidant supplied.

The data store can include other data in addition to the above as well. The above is provided a non-limiting example of the different data that can be stored in memory accessible to the controller 3 so that the controller can utilize that data in its operation for managing and/or overseeing operation of the furnace 2.

Figure 2:
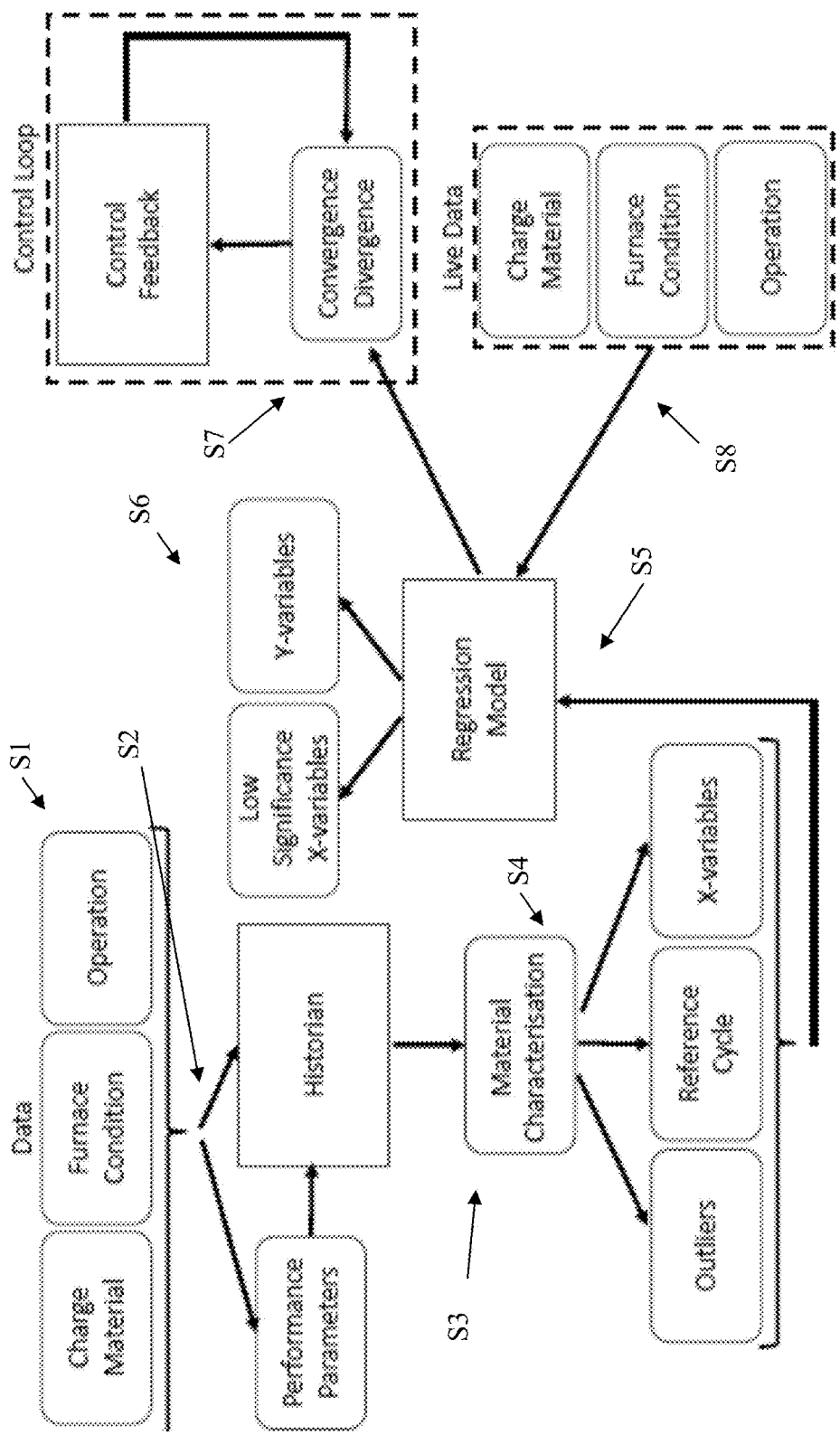
FIG. 2 is a box diagram illustrating control methodology that can be utilized in the embodiment of the controller of the first exemplary embodiment of a system for controlling operations of a furnace.

As may be appreciated from FIG. 2, based on this baseline set of data, the controller can be configured to process that data to define performance parameters both during the cycle and after completion of a cycle. Examples of cycle performance parameters can include all of the following or a selected sub-set of the following:

Cycle Performance Parameters
1. Specific fuel consumption ("SFC"), which can be defined as fuel used for the cycle divided by the total charge weight.
2. Stoichiometric ratio, which can be defined as the ratio of fuel to oxygen compared to the perfect combustion ratio of fuel to oxygen in either air, substantially pure oxygen, or any combination thereof.
3. Metal recovery, which can be defined as the mass of metal (e.g. aluminum, copper, steel, iron, lead, etc.) recovered, divided by the mass of metal containing scrap charged into the furnace. The metal recovery can also be defined as the yield from furnace operations (e.g. amount of metal recovered from the mass of charge material fed to the furnace).

4. Salt usage (mass or percent of charge).
5. Slag usage (mass or percent of charge).
6. Melt rate, which can be defined as the total charge weight divided by the time from the start of firing to the beginning of furnace tapping.
7. Energy losses (e.g. flue losses, convective losses, radiative losses, losses of heat shown in FIG. 1, etc.).
8. Useful energy (e.g. energy absorbed by the charge material to melt the charge material).
9. Metal oxidation (estimated), e.g. aluminum oxidation, copper oxidation, etc. for a particular metal to be melted for the operation of the furnace.

These cycle performance parameters can include other parameters in addition to the above as well. The above is provided as a non-limiting example of the different cycle performance parameters that can be determined by the controller 3 and stored in memory accessible to the controller 3 so that the controller 3 can utilize the parameters during its operation for managing and/or overseeing operation of the furnace 2.

Referring to FIG. 2, the baseline data and cycle performance parameters can be stored in the memory accessible to the controller 3. In addition, the furnace 2 may operate for some number of cycles and the controller can store this operational data and the cycle performance parameters for that data in memory accessible to the controller 3 for subsequent use. The controller can store the data and performance parameters to create a historian data store 9b.

The controller 3 can also use the historian data store so that data of the data categories and cycle performance parameters for each cycle of furnace operation is characterized into a material characterization data store 9b, which groups charge materials of similar size, shape, composition and/or origin. The controller can be configured to form and adjust the material characterization data store 9b from the historian data store so that outlier data for each material type that is utilized from the historian data store is removed to ensure that data and performance parameters fall within a certain variance of an average. The selected variance range for selection and removal of outlier data can depend on the material type as well as other factors (e.g. desired precision of range for historian data sets, desired statistical significance for data set of data in historian, etc.).

After outlier data is removed (for embodiments in which outlier data is removed), each material type in the material types data store 9b, can then be processed by the controller to form one or more reference cycle data stores 9b. The reference cycle data store can be formed to define at least one reference cycle that exhibits a pre-selected performance for the furnace using a particular type of charge material or an average of different conditions and materials. In one instance a reference cycle can represent an optimal performance for a specific condition. In another exemplary instance, the reference cycle can represent an average performance or some other benchmark for comparison purposes. For instance, an average of cycles with the highest SFC or lowest SFC can be used to calculate a relative performance. The calculated relative performance can then be use to compare the calculated relative performance to other cycles and to current cycle performance.

The material characterization data store 9b can also be utilized by the controller to define a number of x-variables for each type of material for use in a regression analysis. The determined x-variables can define a number of different data parameters for furnace condition and operation for each classified type of charge material for analyzing a relationship between those data parameters (x-variables) and the cycle performance parameters, which can be considered y-variables, for a particular type of charge material fed to the furnace.

Once the x-variables and y-variables are defined, the controller 3 can then perform a regression analysis to determine the relationship between key performance indicators and the data logged in the historian data store 9b. In connection with this process, low-significant x-variables can be determined as having minimal effects for particular y-variables for updating of subsequent uses of the regression model and its evaluation of various y-variables.

The regression model results can then be utilized for providing real-time adjustments to control furnace operations. For example, the results from the regression model can be used for utilizing significant x-variable data obtained in real-time for a particular cycle of furnace operations and that data can be used to calculate a desired cycle performance parameter value to use for improving furnace operation for that cycle. This can be done for one or more cycle performance parameters of the furnace.

The regression model utilized by the controller 3 can define a regression analysis that results in production of an equation for each cycle performance parameter (y-variable) to describe that y-variable's relationship with different data parameters (x-variables). Key performance indicators (e.g. one or more performance parameters, which can each be a respective y-variable) can be modelled against all reasonable data parameters ($x_1$, $x_2$, $x_3$ . . . $x_n$) to understand the statistical significance that each x-variable has on the y-variables. The p-value of the coefficients ($A_N$, $B_N$, $C_N$ . . . $N_N$) can directly relate to the statistical significance and the relationship that each x-variable has on the y-variable, determining which x-variables are statistically significant on the y-variables and which are not. The value and the sign (+/−) of the coefficients determine the relative sensitivity of the data parameters to the performance parameters. The regression model can be designed so that it only takes into account the x-variables with high significance (e.g. a significance that is at or exceed a pre-selected statistical significance threshold) and hence, ignores x-variables with low significance coefficients. An example of a low significant coefficient is one or more x-variables determined to have an insignificant effect (e.g. an effect that is below a significance threshold) on the operational parameter y-variable of potential interest. Examples of the equations for each y-variable ($Y_1$, $Y_2$, $Y_3$ . . . $Y_n$) can include, for example:

$$Y_1 = A_1 x_1 + B_1 x_2 + C_1 x_3 + \ldots + N_1 x_n$$
$$Y_2 = A_2 x_1 + B_2 x_2 + C_2 x_3 + \ldots + N_2 x_n$$
$$Y_3 = A_3 x_1 + B_3 x_2 + C_3 x_3 + \ldots + N_3 x_n$$
$$\ldots$$
$$Y_N = A_N x_1 + B_N x_2 + C_N x_3 + \ldots + N_N x_n$$

Non-linear terms and interrelated terms can also be included in the regression model to help provide a high prediction accuracy. Examples of these terms are shown below, where higher value indices are not shown for simplicity:

$$Y_1 = A_1 x_1 + B_1 x_1^2 + C_1 x_1 x_2 + D_1 x_2 + E_1 x_2^2 + F_1 x_1 x_2^2 + G_1 x_1^2 x_2 + H_1 x1^2 x_2^2 + \ldots$$

The regression model can include higher value indices terms and exponential terms. It is also possible to model the performance using other techniques such as partial least squares, principal components or other techniques.

The regression model can be used by the controller 3 to predict performance of the furnace 2 based on data received in real-time related to the furnace operations and provide real-time feedback to change the operating parameters of the furnace. The live x-variable data logged during the current cycle can be input into the regression equations of the regression model, which are compared to the respective reference melts of the data of the historian data store 9b as the cycle progresses. The regression model can be used by the controller 3 to identify if the y-variables (e.g. cycle performance parameters) begin to diverge from the reference case of the determined reference cycle. If a divergence is detected, the controller 3 can determine which control parameter(s) should be changed in order to mitigate the divergence. The regression model can be used to optimize all of the y-variables or any number of single y-variables based on the x-variable data of the current on-going furnace operation depending on the particulars of data related to that particular on-going cycle of furnace operation. For example, the SFC can be optimized. As another example, the yield of the furnace can be optimized. As yet another example, the yield as well as the SFC can be optimized for a particular cycle based on the data of the x-variables for that on-going cycle of operation of the furnace by the controller's adjustment of various control parameters that are determined by use of an embodiment of our process.

For instance, the results of the regression analysis performed by the controller 3 can be utilized to adjust furnace operations in real-time by the controller calculating a relative extent of aluminum oxidation (a cycle performance parameter, y-variable for the regression model) from the real-time sensor data via use of the historian data log and the significance of the data determined from use of the regression model during a present cycle of furnace operation. This aluminum oxidation estimation can then be used in real-time during the cycle to provide feedback information to a control loop of the controller 3 to control the furnace operation in order to mitigate aluminum losses and improve yield. This approach can also account for mass energy balance errors that can occur due to the variability in a given charge material.

As may be appreciated from the above and FIG. 2, an embodiment of the control process performed by the controller 3 can include storing data parameters related to the charge material, furnace condition and operation data parameters in a first step S1. This stored data can then be used to create the historian data store in a second step S2. The data parameters stored from step S1 are also used to calculate the performance parameters, which are logged in the historian as well during the second step S2 to form the historian data store 9b.

The cycles are then characterized in a third step S3 into one or more material groups, which are analyzed in a fourth step S4 to calculate the averages and variances of the data and performance parameters. Outliers are determined in this fourth step S4 by identifying values that fall outside a certain variance of the average, which can vary depending on material type. Outliers can be removed from the dataset and the data from the remaining cycles can make up the x-variables for one or more reference cycles that are to be fed into the regression model in a fifth step S5. Y-variables can be any data or performance parameter that can be modelled for optimization based on use of the regression model in the fifth step S5. For example, specific fuel consumption, melt rate and yield. One way of defining a reference cycle for each y-variable can be determined by identifying 'best case' cycles, which convey near-ideal performance. The reference cycle data can be data for just one best reference cycle or there can be multiple best reference cycles that are defined based on the charge material to be fed to the furnace 2. The reference cycle case can be an average of these 'best case' cycles of furnace operation for a particular type of charge material or there may just be a single best case cycle of furnace operation defined for all types of charge material. There may also be other reference cycles where expected performance is achieved even if it is not a 'best case'. There can still be other types of reference cycles defined that allow a comparison to the current cycle to historical performance and allow the controller 3 to utilize real-time sensor data and compare that data to the determined reference cycle to determine how an ongoing cycle is operating compared to other cycles. The controller 3 can utilize this comparison to determine how to adjust furnace operational parameters (e.g. various setpoints, etc.) accordingly to achieve one or more cycle objectives (e.g. maximize yield, optimize SFC, optimize SFC and also yield, etc.) for processing the material during the ongoing cycle.

The regression model can be used by the controller 3 to determine the relationship between x-variables and y-variables in a sixth step S6, as explained above and herein, where low significance x-variables can also be removed from the analysis. In a seventh step S7, live charge material, furnace condition and operational data (x-variables) obtained in real-time (e.g. within seconds or minutes of the actual ongoing operation of the furnace 2, within a time period that is within 1-15 minutes of that data being collected from the ongoing operation of the furnace 2, etc.) are input into the model so that the controller can calculate performance parameters (y-variables) as the cycle progresses based on this x-variable data obtained during operation of the furnace. In an eight step S8, the calculated y-variable (cycle performance parameter) values can be compared with the corresponding y-variable values from the reference case in real-time so that the controller can identify if and when a particular real-time calculated y-variable deviates significantly from the reference case. If the cycle performance follows the reference case throughout the cycle within a reasonable degree of error (e.g. within +1-5% or within +1-10% of a pre-selected performance defined by at least one reference cycle calculated by the controller), then the performance is considered to be within expectations and no corrective action is taken or recommended.

But, upon a determination that the on-going cycle performance begins to deviate and continues to deviate significantly from the reference case or from the pre-selected desired performance, then the controller can determine that the furnace performance has deviated from the pre-selected furnace performance objective and an adjustment in operation is needed. Such a determination can be made by the controller determining that the furnace operation has diverged from the reference case or from the desired performance based on the comparison of real-time sensor data of the furnace for the ongoing cycle with at least one calculated reference cycle. A detection of divergence can occur, for example, by the controller detecting from its comparison that a difference that met or exceeded a significance threshold from furnace performance was present based on the real-time sensor data. Such a furnace performance benchmark can be defined by one or more reference cycles that the controller calculated from historical data in memory accessible to the controller 3.

Upon determining an adjustment in furnace operation is warranted, the controller can initiate corrective action by providing adjustment data to the control loop to adjust control parameters of the furnace (such as burner firing rate, furnace rotation speed, furnace tilt angle, etc.), to correct the furnace performance so that the furnace x-variable data received after the correction changes to be closer to the desired reference case(s) or performance. Such initiation can occur by the controller 3 automatically sending one or more control messages to PLCs of the furnace. Such correction action can also, or alternatively, be taken by the controller communicating one or more messages to an operator computer device 10 to facilitate the operator providing input via the operator's computer device 10 to adjust setpoints and/or other operational control parameters as determined to be needed by the controller 3.

Exemplary examples of implementation of the controller 3 and its operation for controlling furnace operations are provided below. These non-limiting exemplary examples can help further convey how the controller 3 can be implemented to correct the calculations for the required energy for furnace operation to improve the yield as well as other cycle performance parameters of the furnace so that the furnace can be operated to improve profitability and also reduce emissions, fuel usage, electricity consumption as well as improve other aspects of the operation of the furnace. Embodiments of the controller 3 can be implemented so that a required energy calculation can be corrected as may be necessary so that the required energy calculation converges the performance of the furnace at or to a defined desired performance level (e.g. a reference case performance level defined in the fifth step S5 of an embodiment the method discussed above, a desired operation that is defined by a reference cycle model that was derived based on historical data of the historian data store 9b.).

Example 1

Figure 3:
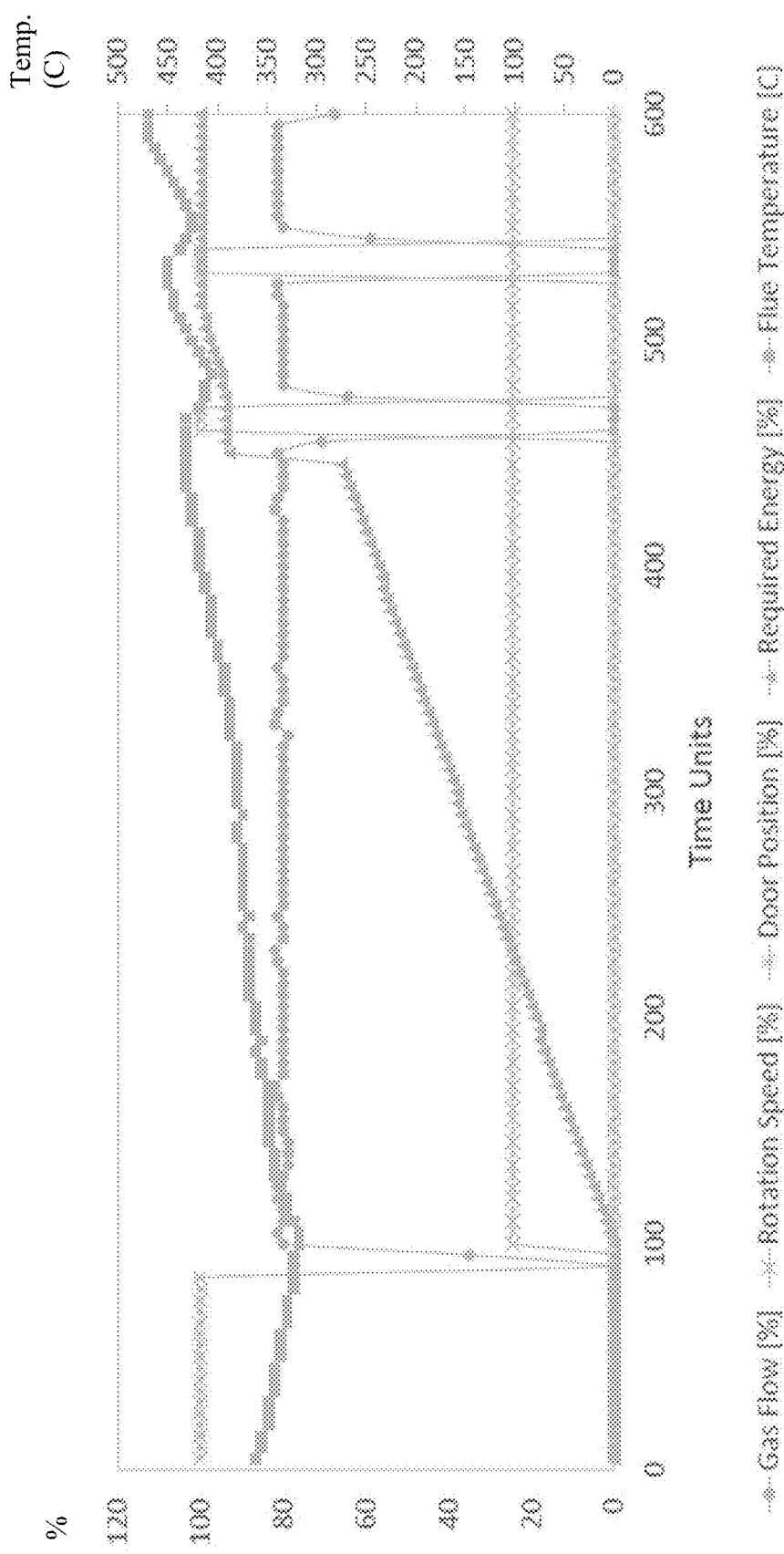
FIG. 3 is a graph illustrating an exemplary end of melt correction.

FIG. 3 illustrates a graph showing a cycle where the required energy calculation was corrected due to divergence from utilization of an embodiment of our method implemented in an exemplary embodiment of the controller 3. The burner gas flow rate, furnace rotation speed, furnace door position, required energy calculation and flue temperature are shown in FIG. 3. Initially, the furnace door is open (100%) for charging, where the burner is off (0%), the furnace is not rotating (0%) and the flue temperature can be seen to be reducing as it moves to equilibrium with the ambient conditions. At time 77, the furnace door is closed and subsequently the burner is turned on to 80% firing rate and the furnace is set to 40% rotation speed. As time progresses the required energy calculation can be seen to increase steadily up to about 65% of the total required energy (percent completion) at around 435 time units. Leading up to this point, the controller 3 recognized a significant deviation from the reference or desired performance. The significant deviation was determined as a difference was detected that met or exceeded a significance threshold. The extent of the material composition variation error was determined and the 'end of melt' calculation was corrected by the controller 3 so that furnace operational parameters would be adjusted to bring the furnace performance back in-line with the reference case. The required energy calculation can be seen to 'jump' from 65% to 93% completion at time 435, where the controller's use of the regression model corrected for a lower amount of aluminum than the expected composition. In this case, with less aluminum content, there is more alumina, which does not undergo phase change at the same temperature as the aluminum within the charge. Consequently, less energy is required for the charge to reach tapping temperature and hence, the required energy calculation corrected to a higher percentage completion.

Example 2

Figure 4:
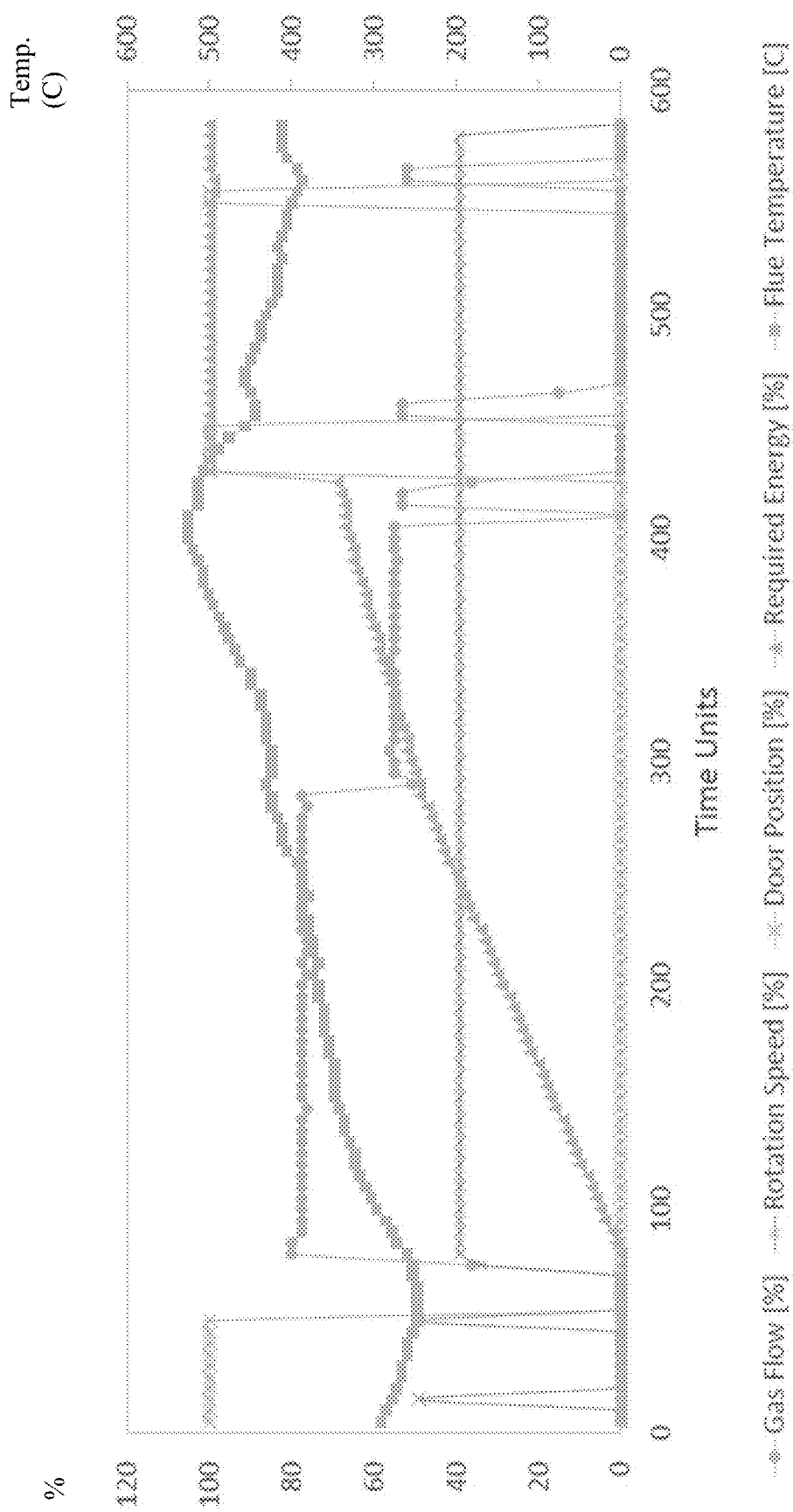
FIG. 4 is a graph illustrating an exemplary correction that can account for metal oxidation (e.g. aluminum oxidation).

This example, which is shown in FIG. 4, shows how the controller 3 can be used to correct for aluminum oxidation (yield) losses when the furnace 2 is used for melting of aluminum. In this example, the controller defined a regression equation relating yield loss (a y-variable) to the data parameters (x-variables) to mitigate yield losses during a given cycle of the furnace. Typically, it is expected that aluminum will always oxidize to some extent during a cycle, due to the nature of the melting process. The regression model was defined for use by the controller 3 to compare the performance of the live cycle to the reference case to determine the extent in which the aluminum oxidation occurs throughout the cycle. In this exemplary case, the reference cycle is considered to undergo minimal aluminum oxidation. When significant aluminum oxidation is identified, corrective action was taken, where typically, either the burner firing rate and/or furnace rotation speed can be reduced and sometimes additional flux (salt) may also be required. An example of this correction is shown in FIG. 4.

FIG. 4 shows a cycle where significant aluminum oxidation was detected by the controller 3 and the controller can provide control signals so that mitigating action could be implemented. In addition to detecting aluminum burning, the model corrects for the charge composition as in the previous example to maximize accuracy and performance in the required energy calculation. As can be seen in FIG. 4, the burner gas flow rate, furnace rotation speed, furnace door position, required energy calculation, and flue temperature are shown. Initially, the furnace door was open (100%) for charging, where the burner is off (0%), the furnace was intermittently rotating and the flue temperature can be seen to be reducing as it moves to equilibrium with the ambient conditions. At time 54, the furnace door was closed and subsequently the burner is turned on to 78% firing rate and the furnace was set to 40% rotation speed. As time progresses the 'end of melt' calculation can be seen to increase steadily up to about 50% completion at time 290. After this point, the controller 3 determined that the aluminum oxidation diverged significantly from the desired condition and that mitigating action had to be taken. After the reduction in firing rate occurred, the required energy calculated approach to completion can be seen to increase at a slower rate, due to the reduced energy input. The required energy calculation increased up to approximately 70% completion, at which point it can be seen to jump to 100% completion at time 425.

In this example of FIG. 4, the correction that was made was due to deviations in both the compositional assumptions and the aluminum oxidation approximation y-variable. The energy release from the aluminum oxidation contributed to the energy required to bring the charge material to tapping temperature. The mitigating action was to turn off the burner and the furnace door was opened to verify the required energy calculation. The burner was fired again for 8 time units before mitigating action stopped the burner. The furnace was then rotated without the burner on for 85 time units before the operators opened the furnace door again at time 550. At this point, the required energy can be seen to reduce from 100% to 99% completion, where the burner was started for a short time to bring the required energy back to 100% completion.

Example 3

Figure 6:
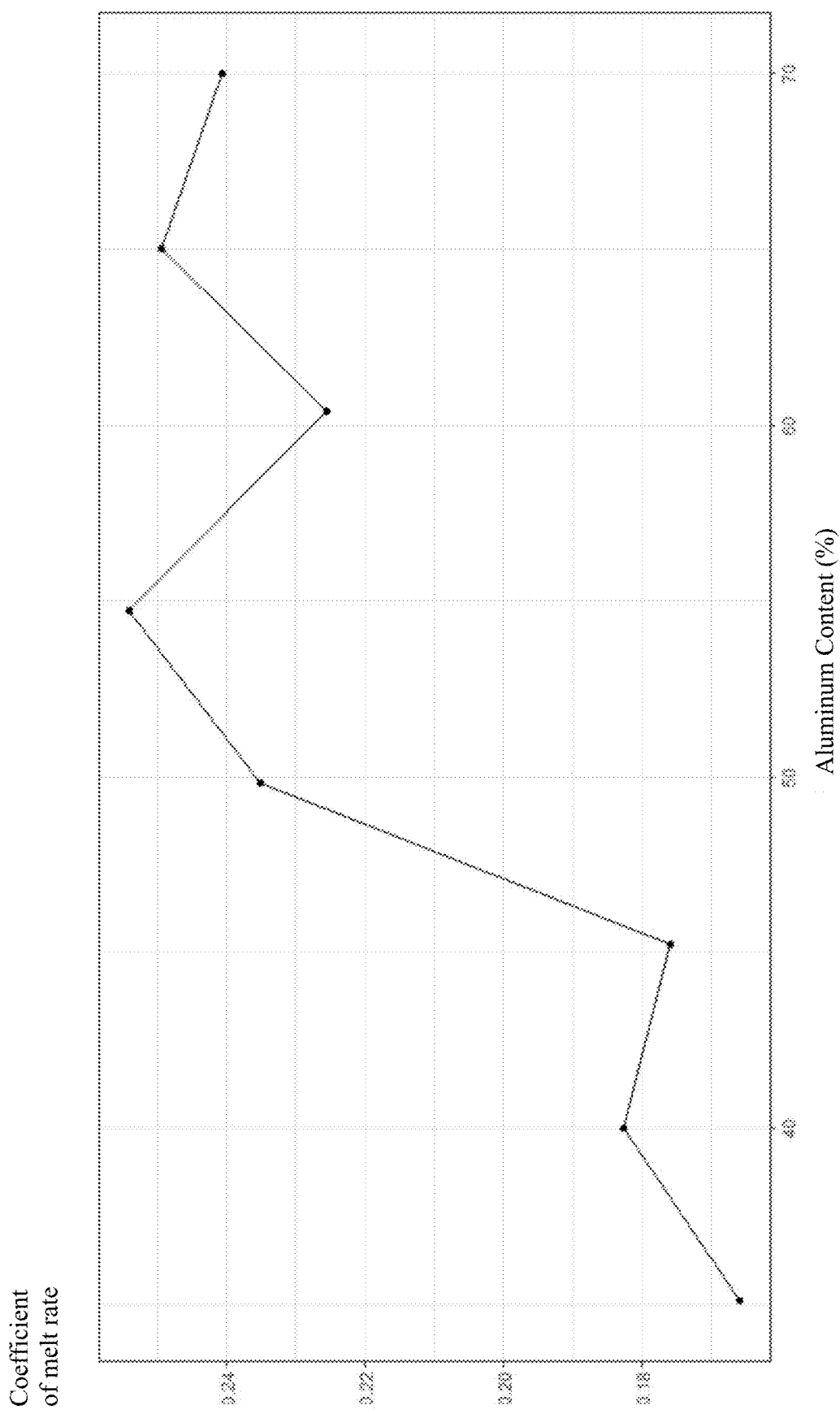
FIG. 6 is a graph illustrating the effect of material yield on the coefficient of melting rate on yield loss. This graph shows that, on average, as yield of the material increases, the sensitivity of yield loss to melt rate increases as well.
Figure 7:
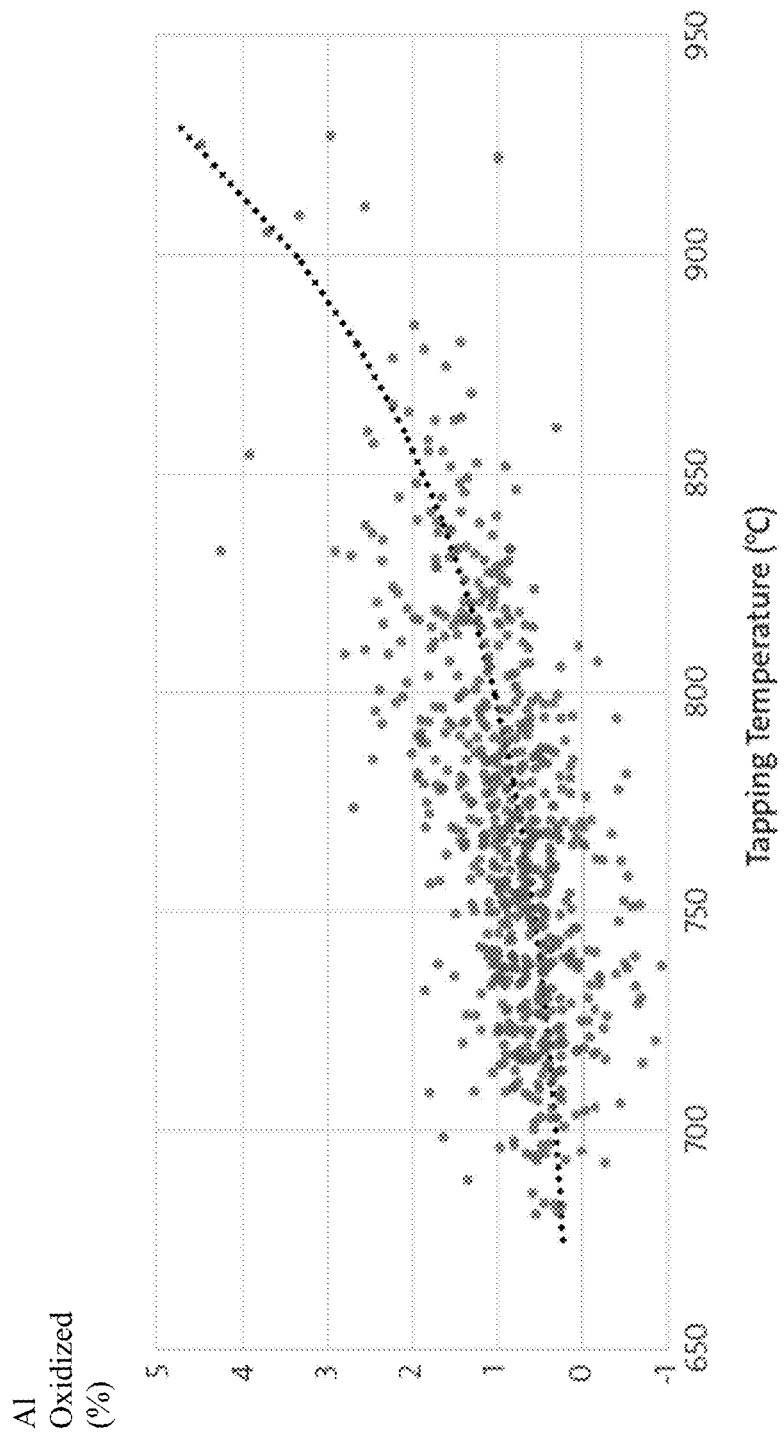
FIG. 7 is a graph illustrating how the yield loss (y-axis) can be affected by the amount of aluminum present in the charge material (x-axis) in the first exemplary embodiment of a system for controlling operations of a furnace when charge material that includes aluminum is being melted.
Figure 8:
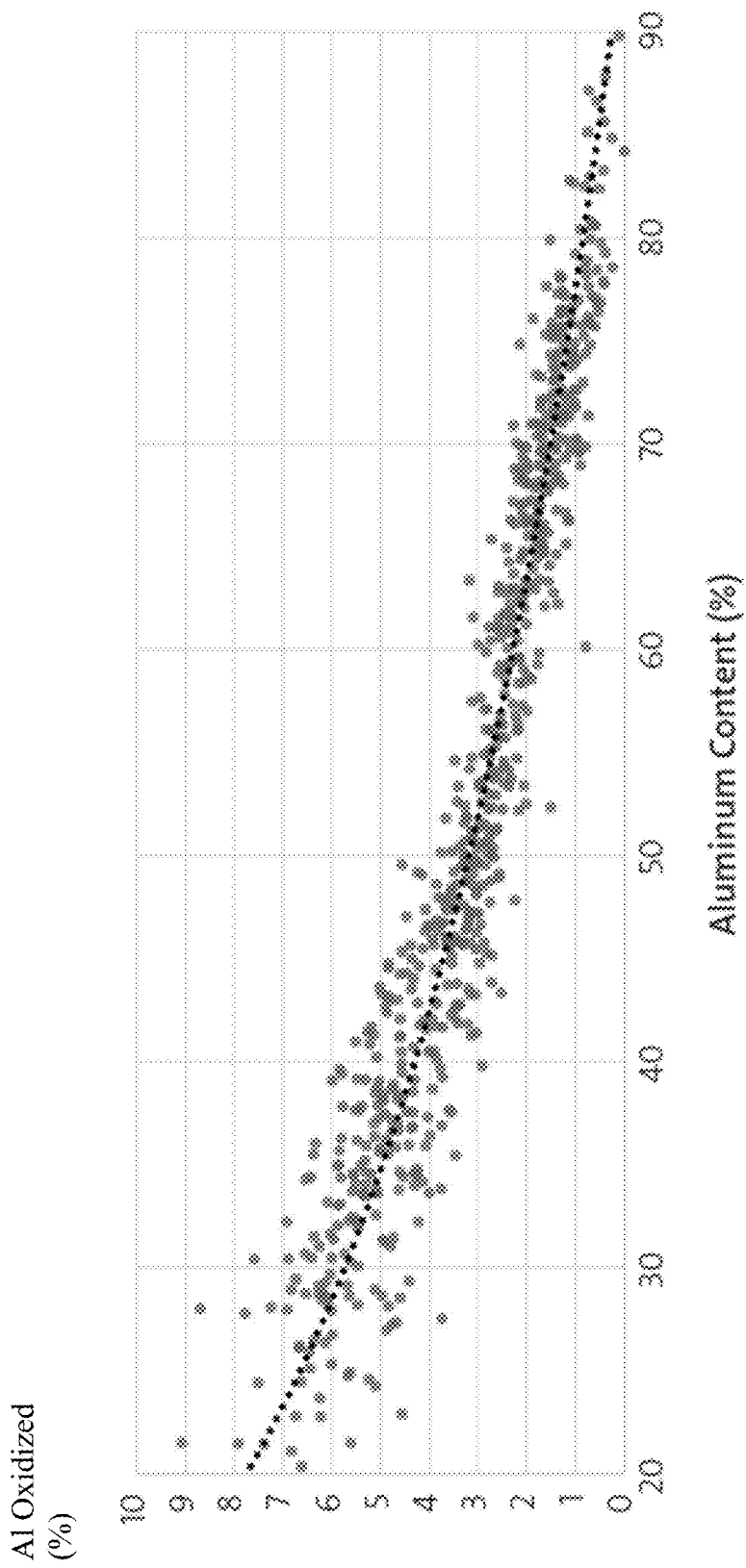
FIG. 8 is a graph illustrating a relationship between yield loss (y-axis) and tapping temperature (x-axis) that can be present in the first exemplary embodiment of the system for controlling operations of a furnace when charge material that includes aluminum is being melted. This graph provides an example that illustrates the importance of tapping temperature on loss of a metal (here, aluminum loss). For example, tapping liquid aluminum at 900° C. as compared to 750° C. for a charge material with 80% aluminum content will lead to an additional yield loss of about 3% in the example of FIG. 8.

To help further demonstrate the improved performance that embodiments of the controller 3 can provide, a sample of nearly 700 cycles from an aluminum tilt rotary furnace are discussed as an example with reference to FIGS. 6-8. The materials were characterized into 9 different material groups in the third step S3 of the method for this embodiment of this example. The expected aluminum content of these material groups ranged between 20-80% aluminum. The number of cycles in each material group ranged from 25-86 cycles and the percentage aluminum in each material varied no more than +1-5% of the average aluminum content.

The y-variable chosen in step S6 of the embodiment of the method for this example was aluminum oxidation (yield) losses and the resulting statistical model showed that there were a number of x-variable parameters that significantly affected yield loss, including the ratio of salt used, aluminum and oxide content in the charge material, melt rate, metal tapping temperature and a number of operating and furnace conditions. The controller 3 used a regression equation that was found to have an average $R^2$ value of 0.76 (an $R^2$ value is a well-known statistical measure of how close the data are to a fitted regression line. It is also known "R-squared", the coefficient of determination, or the coefficient of multiple determination for multiple regression.). For individual material groups, $R^2$ values ranged between 0.62 and 0.89 and the effects of different x-variables on the y-variable can vary across different material groups. This variation is illustrated through FIGS. 5-7.

Figure 5:
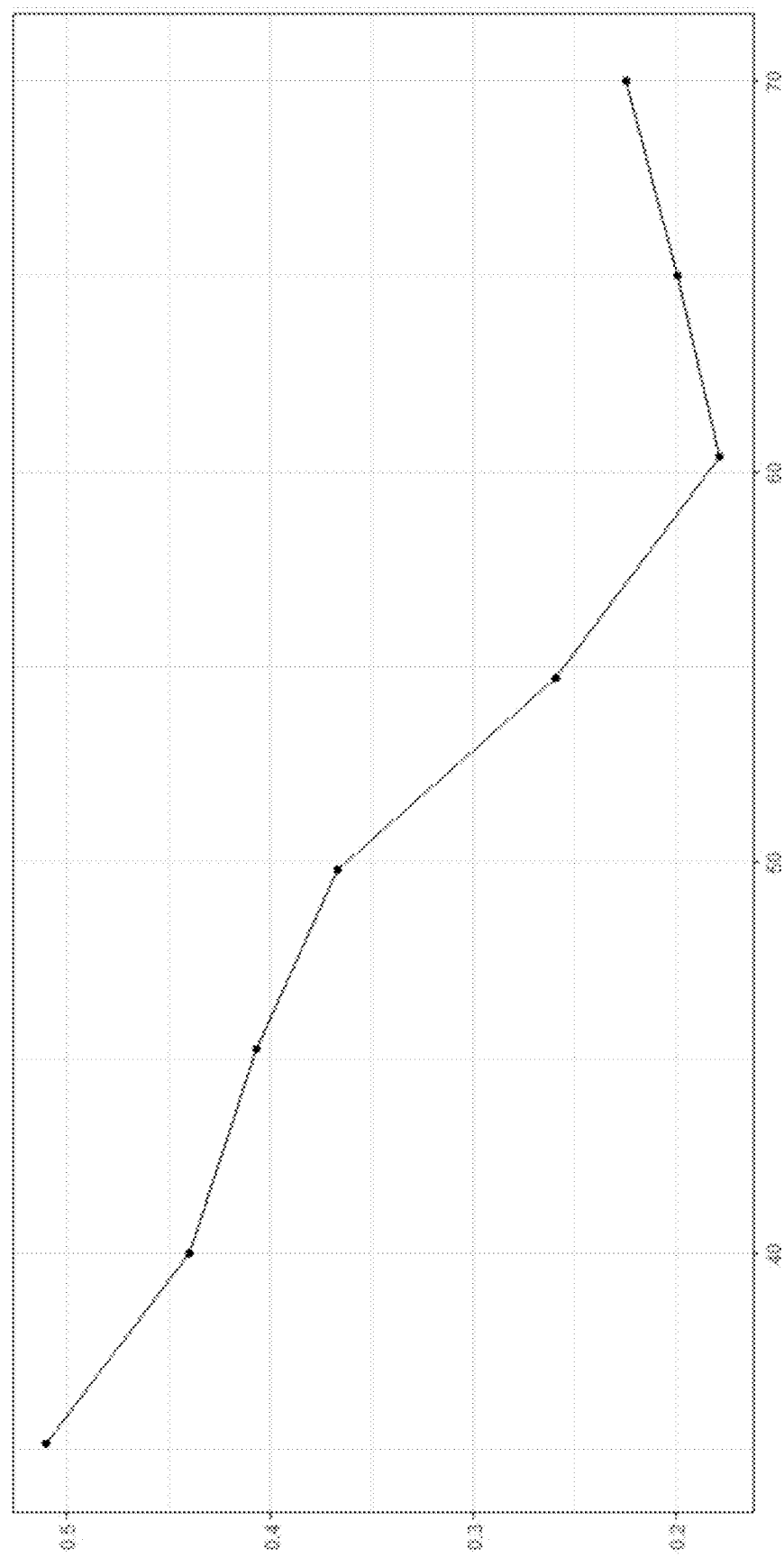
FIG. 5 is a graph illustrating that, as yield of the material increases, the effect of pour temperature on yield loss decreases until about a 60% yield, beyond which it again starts increasing again. Or in other words, a 60% yield material can have the least yield loss sensitivity to pour. The y-axis of the graph of FIG. 5 is the coefficient of exponential, which is the pour temperature divided by 680° C. ("coefficient of exp. (pour-temp./680° C.)").

For example, FIG. 5 is a graph illustrating that, as yield of the material increased, the effect of pour temperature on yield loss decreased until about a 60% yield, beyond which it again started increasing again. Or in other words, a 60% yield material can have the least yield loss sensitivity to pour temperature.

FIG. 6 is a graph illustrating the effect of material yield on the coefficient of melting rate on yield loss. This graph shows that, on average, as yield of the material increased, the sensitivity of yield loss to melt rate increased as well.

FIGS. 5-6 help show that many of the variables were correlated with each other and hence a Partial least squares (PLS) regression model that uses independent predictors (x-variables) created from the set of variables supplied, can be more suited for the purpose of modeling yield loss for use by the controller 3. In the resulting regression model, containing linear, higher order and cross-variable terms of these fundamental predictors, only three principal components were sufficient to address 78% of the variability of the data. Additionally, the linear regression coefficients constructed from the model carried the same sign as in the simple group specific linear regression models, which helps show that the effects of the chosen variables had significance.

Example 4

FIGS. 7 and 8 illustrate control results obtained from an exemplary embodiment of the controller 3 utilized in conjunction with a tilt rotary furnace 2 that was used to remelt charge material that included aluminum containing dross materials. Furnace cycle data from a large number of cycles was analyzed to determine aluminum oxidation losses over a large number of cycles and regression analysis that was performed showed an exponential relationship between yield loss and metal tapping temperature. Baseline data was compared with data from cycles that were completed using an embodiment of the controller 3, which showed that accurate model end of melt prediction, combined with timely burner shutdown control, could be provided by the controller 3. This was able to provide significant benefits in production and yield, as well as energy savings.

The controller 3 was able to calculate when the aluminum inside the furnace 2 had reached tapping temperature and predicted when the melting part of the cycle was complete. The results discussed herein, show that this, combined with timely burner shutdown, prevented the aluminum from being overheated, resulting in less aluminum burning, leading to improved yield. Furthermore, the system used in Example 4 was found to provide a reduction in overall cycle time and energy consumption, which increased productivity while also reducing carbon emissions.

An embodiment of our controller 3 for Example 4 was included on an oxygen-natural gas fired, double-pass, 12 metric tonne (MT) tilt rotary furnace (TRF) processing aluminum drosses with varying composition. Both the furnace and burner system were controlled by Allen Bradley program logic controllers (PLCs), charge materials were loaded using a manual system and liquid aluminum was tapped into sow molds (examples of vessels 2v) in batches.

A user interface and communications panel were installed locally. The communications system comprised of a central data collection device, wired and wireless communications, and an internet connection. Data was collected multiple times per minute from the different components of the system using a variety of methods based on how the data were accessible. Modbus TCP was used to transfer the data that was available digitally from the PLCs to the central data collection device. Additional sensors were installed and connected directly to the communications panel using standard wired protocols or wirelessly using Zigbee. Once the data were centralized, the data was encrypted and securely transferred over the internet to a Cloud system for remote processing, storage, and access. Once the data were processed, the real-time results were sent back to the user interface for operator access and assistance in decision making.

In addition to the results being immediately available to the operators via a human machine interface (HMI), e.g. a graphical user interface on a display of computer device 10. Management personnel also had access to the real-time and historical data via a web browser-based dashboard that was accessible on desktop and mobile devices, which are other examples of the computer device 10 shown in FIG. 1 that can be communicatively connected to the controller 3. Additional analytics were sent daily to plant management summarizing the activities of the previous day in terms of material processed, tap temperatures, cycle times, etc. These results were also compiled and archived on a monthly basis for historian purposes.

The controller 3 was configured to utilize a real-time mass-energy balance, based on historical and live data. To help ensure model accuracy for the regression model used by the controller 3, the data in the historian data store 9b included data over a long enough period of time to capture the variability of the process. Mass input and output were logged for each cycle, including charge material size, composition and weight and output of liquid aluminum and salt slag for a number of cycles of operation of the furnace 2. The useful energy into the process was calculated based on energy input through the burner, furnace losses and energy absorbed into the refractory (see e.g. losses identified in FIG. 1).

Combustion efficiency was calculated using burner gas flow rates, which were measured directly from mass flow meters. Furnace energy losses, including shell losses, door losses and flue losses, were all measured with temperature sensors. Liquid aluminum temperature was measured during tapping, where the tapping temperature was fed back into the model to verify the mass-energy balance calculation. Over time, as more and more data were collected, the model accuracy improved. For this study, the digital twin model was designed to reduce variability and improve yield. The technology can also be applied to focus on increasing throughput and productivity.

For the controller of Example 4, we assumed that during secondary aluminum remelting, a portion of the aluminum in the charge inevitably oxidizes and produces heat that adds to the supplied energy from the burner and contributes to the energy required for melting. The energy from aluminum oxidation, and hence aluminum losses, can be significant depending on a number of factors, including material composition, salt usage, burner firing rate and furnace conditions. Aluminum oxidation losses can be referred to as yield loss, which is expressed in percentage terms, where the weight of aluminum oxidized is divided by the total weight of aluminum present in the charge. The yield loss was estimated for each cycle in the embodiment of example 4 by analyzing the energy balance to understand the extent of aluminum oxidation during the cycle. Using this yield loss estimate, a thorough analysis of the important parameters influencing yield loss was performed using regression methodology (see e.g. steps S5-S6 of the embodiment shown in FIG. 2).

A number of statistical methods were used to understand the effects of different factors influencing aluminum oxidation (yield loss). Initially, a large number of reasonable predictors, such as charge weight, melting time, salt ratio, etc. (x-variables) were used as inputs into a statistical model for the controller 3 to determine their significance on yield loss (a selected y-variable). The coefficients for each x-variable in the statistical model directly related to their impact on yield loss and any terms with low statistical relevance were eliminated (see e.g. sixth step S6 of the embodiment illustrated in FIG. 2). The resulting statistical model showed that there were a number of parameters that significantly affected yield loss, including the ratio of salt used, aluminum and oxide content in the charge material, melt rate, metal tapping temperature and furnace condition, where furnace condition was a calculated parameter comparing the furnace condition to previous cycles. The result was a model with an $R^2$ value of 0.83 using data from a total of 674 cycles from 9 different groups of major materials. The sign and magnitude of the coefficient of each x-variable parameter was studied to better understand its effect on aluminum oxidation (the selected y-variable) and two factors in particular were found to be highly influential, namely aluminum content of the charge material and tapping temperature.

FIG. 7 shows how the yield loss (y-axis) was affected by the amount of aluminum present in the charge material (x-axis) determined in Example 4. The yield loss is the amount of aluminum oxidized for a given cycle, expressed as a percentage of the aluminum present in the charge material. The graph shows that, all other predictors remaining constant, as the percent of aluminum in the charge material increases, the chances of aluminum oxidation decreases and vice versa. Hence, yield loss can increase by 7.5% when processing a material with 20% aluminum content, when compared to a material with 90% aluminum content.

This can be attributed to a number of physical factors. As the percentage of aluminum present within the charge decreases, the presence of oxides increases and hence salt is often added to the process. The energy input into the process is then used to heat the oxides and the salt, as well as the aluminum. Aluminum dross materials entrap aluminum within the oxide layers, which require significant energy to release by breaking down the oxide layers. The result is that more energy per unit of aluminum is required to heat the charge material, resulting in overheating of the aluminum trapped within the dross. Moreover, the aluminum is released from the oxide layers as small droplets, which have a high surface to volume ratio, providing more opportunity for oxidation to take place, compared with a solid block of aluminum that can melt more evenly.

FIG. 8 shows the relationship between yield loss (y-axis) and tapping temperature (x-axis) determined in Example 4. An exponential model was found to be a better fit than a simple linear model for the embodiment of the controller used in Example 4. FIG. 9 helps illustrate the importance of tapping temperature on aluminum loss that was identified in Example 4. For example, tapping liquid aluminum at 900° C. as opposed to 750° C. for a charge material with 80% aluminum content, can lead to an additional yield loss of about 3%.

The controller 3 was able to improve aluminum yield in Example 4 by reducing tapping temperature through better prediction of when the material inside the furnace was ready to be tapped. Initially, baseline data was gathered in a first step S1 over a seven-month period before the controller 3 was implemented in order to document and assess the variability of the process and form the historian data store in a second step S2. The majority of materials charged into the furnace were drosses, which were characterized into material types in the third step S3, based on size, composition and origin. Over 1,000 cycles were analyzed to determine the average tapping temperature. After the implementation of the controller 3, 350 cycles were analyzed in which the controller 3 monitored and/or adjusted furnace control parameters based on real-time data for those cycles and the overall average tapping temperature was successfully reduced by 25° C., where furnace operations for melting some materials were improved more than others. The average reduction in temperature corresponded to a yield improvement of 0.30%, according to the graph in FIG. 9. Some materials improved by more than 50° C., corresponding to a 0.5%-0.75% yield improvement.

The improvement in furnace operation can provide a reduction in melt time, a reduction in energy usage (e.g. fuel costs) and an increase in yield. This type of improvement can have a significant impact on the profitability of furnace operations. For instance, for a furnace with a capacity of 10 million tonnes, melting 3 million tonnes per hour and operating for 48 weeks of the year and having an estimated annual production: 24,000 million tonnes per year, an embodiment of the controller can reduce melting time by 10%, reduce energy usage (e.g. reduce the amount of oxygen gas and natural gas used for operation of the burner 2b) by at least 5% and improve yield by 0.5%. We estimate that such an improvement would result in improving the profitability of operation of such a furnace by about $580,000 US per year, or over £461,000 per year (sterling pounds of the United Kingdom). This example is provided to help quantify the significance in the operational improvement embodiments of the controller 3 and embodiments of our furnace operational method can provide. Different furnaces of different sizes and types can obtain greater improvements than this exemplary improvement or may not experience quite as much improvement than this exemplary improvement depending on a number of factors (e.g. size, operational capacity, value of metal being processed in the charge material, etc.).

By focusing the controller 3 in Example 4 on reducing tapping temperature, as well as improving yield, there was also a significant reduction in tapping temperature variability, resulting in more consistent tapping temperatures and melting times. As a knock-on effect, energy usage dropped by an average of 5% because the burner was turned off in a timelier manner, compared to baseline cycles of stored data collected before the controller 3 was implemented. More consistent melting times can also lead to an increase in productivity, which could be seen in some charge materials, where melting time was reduced by up to 10.5% and even higher in other cases, where the material properties varied significantly. The reduced variability in tapping temperature allowed for more precise control of the furnace operation and the ability to lower tapping temperatures even more, leaving room for further optimizations in the future.

We believe our results from Example 4 are consistent with how aluminum readily oxidizes in air and how a thin layer of aluminum oxide (alumina) can quickly form around a freshly exposed solid aluminum surface. Hence, aluminum may always contain at least a small amount of alumina. Once a thin layer of alumina has been formed, the aluminum can be protected from further oxidative attack. However, as aluminum is heated, it can become more receptive to oxidative attack, as the alumina 'skin' begins to react with the atmosphere and breaks down, forming cracks in the protective alumina shell. At higher temperatures and during the melting phase in the furnace, we determined that the oxidation rate can increase as oxygen can penetrate further into the metal due to the changing crystalline structure of the alumina with increasing temperature.

In a tilt rotary furnace processing of aluminum dross and scrap, the oxide layer may not remain intact during high temperature and melting phases. The constant movement of the furnace can provide mechanical stimulation to break the oxide layer. Furthermore, salt is often added to the process, providing a chemical means to break down the oxide layer. The purpose of adding the salt is to extract as much liquid aluminum as possible by allowing the aluminum to escape from the oxide layers. Once the aluminum has become liquid, the oxides and salt float to the surface, providing a physical barrier to protect the molten aluminum from oxidative attack. However, the continuous movement and mixing can constantly break the protective layer of oxide and salt, resulting in further oxidation.

We determined that the oxidation reaction rate can be significantly faster at temperatures above the melting point of aluminum (660° C.). We found that an exponential increase in oxidation rate with an increase in temperature can occur, suggesting that reducing aluminum tapping temperature improves aluminum yield. Therefore, by focusing the embodiment of the controller 3 used in Example 4 on reducing tapping temperature, aluminum yield was also able to be increased by preventing the metal from overheating and not kept at high temperatures for prolonged periods of time.

Examples 1–4 are exemplary in nature as are the other embodiments discussed herein. It should be understood that different embodiments of our controller 3 can be utilized for incorporation into a system 1 for use with a furnace 2 to adjust operation of a furnace 2 when the furnace melts a metal, such as aluminum, lead, iron, steel, or copper as may be determined to be needed to control operation of the furnace so that one or more control parameters can be dynamically adjusted to better meet a particular set of cycle performance parameters (e.g. yield, yield and SFC, yield, melt rate and SFC, etc.). Embodiments of our system 1, controller 3, and method of controlling furnace operation can be utilized to help improve yield and other performance metrics. Embodiments of our controller, system, and method can take a significantly different approach for determining adjustments to furnace operations that can uniquely account for mass and energy balance calculation errors that can exist when melting metal materials in which the metal content of the material varies significantly or is otherwise not well understood.

Embodiments of our method, controller 3, and system 1 can provide a unique way of improving process performance for furnaces 2. Key performance and operational parameters can be logged over time and used so that historical and real-time data can be utilized to determine when the metal being melted in the furnace 2 has reached a target temperature. Real-time feedback can be provided to operators with information on when the metal is ready for tapping so that the opening of the door 2a and feeding of the sufficiently melted metal into one or more vessels 2v can occur more consistently in a manner that improves yield while reducing emissions and costs. As new data continues to be fed into the control for updating of the historian data store and updating of the regression model in steps S2-S6, the predictions of the controller and control parameter adjustments provided by the controller 3 can further improve over time to provide even better improvements in furnace operation.

It should be appreciated that modifications to the embodiments explicitly shown and discussed herein can be made to meet a particular set of design objectives or a particular set of design criteria. For instance, the arrangement of valves, piping, sensors, controller, communication connection elements (e.g. wiring, intermediate network nodes, network arrangement, etc.), furnace, and sensors, and other elements can be arranged, sized, and designed to meet a particular plant layout design that accounts for available area of the plant, a particular array of sensors, controller hardware, and furnace operational requirements and other design considerations. It should be appreciated that embodiments of the system 1 can be configured to include various process control elements positioned and configured to monitor and control operations (e.g. temperature sensors, pressure sensors, flow sensors, target element concentration sensors, an automated process control system having at least one work station that includes a processor, non-transitory memory and at least one transceiver for communications with the sensor elements, valves, and controllers for providing a user interface for an automated process control system that may be run at the work station and/or another computer device, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a system for controlling operations of a furnace, a controller for furnaces, and methods of making and using the same have been shown and described above, it is to be distinctly understood that the invention is not limited thereto but may be otherwise variously embodied and practiced within the scope of the following claims.

What is claimed is:

1. A method for controlling operation of a furnace to melt a material that comprises metal, the method comprising:
   storing data parameters related to the charge material, furnace condition and operation data for the furnace for a plurality of different cycles of operation of the furnace in a non-transitory computer readable medium of a computer device;
   creating or determining one or more cycle performance parameters based on the stored data parameters;
   creating a historian data store based on the stored data parameters and the cycle performance parameters, the historian data store being created such that outlier data for each of the one or more cycle performance parameters is not included in the historian data store, the outlier data for each of the one or more cycle performance parameters being data for that cycle performance parameter that is outside of a pre-selected variance range for an average value for the cycle performance parameter;
   after removal of the outlier data to create the historian data store, determining x-variables from the historian data store for one or more cycles of operation of the furnace and feeding the x-variables into a regression model to determine a relationship between at least one of the x-variables with at least one y-variable to define at least one reference cycle, each y-variable corresponding to a respective one of the cycle performance parameters;
   receiving real-time data from sensors of the furnace;
   comparing the real-time data from the sensors of the furnace to the at least one reference cycle to determine whether an adjustment to one or more furnace operational parameters is needed;
   upon determining that a difference from the at least one reference cycle exists that meets or exceeds a significance threshold based on the comparing of the real-time data from the sensors of the furnace to the at least one reference cycle, adjusting operation of the furnace so that operation of the furnace is adjusted to converge toward a pre-selected furnace performance defined by the at least one reference cycle and
   determining the relationship between x-variables and y-variables via the regression model to identify one or more significant x-variables, insignificant x-variables being x-variables determined to have an effect that is below a pre-selected significance threshold and each of the one or more significant x-variables having an effect that is above the pre-selected significance threshold;
   utilizing the real-time data from the sensors of the furnace for the identified one or more significant x-variables to calculate at least one desired cycle performance parameter value for use in improving furnace operation for a cycle of furnace operation.

2. The method of claim 1, comprising generating the at least one reference cycle, the generating of the at least one reference cycle comprising:
   characterizing the cycles of operation of the furnace into one or more material groups for generation of the at least one reference cycle for a desired performance of the furnace.

3. The method of claim 1, wherein the creating of the historian data store comprises removing the outlier data from material groups before feeding the data parameters to the regression model, the outlier data from the material groups being the data parameters that are outside a pre-selected variance from an average value.

4. The method of claim 1, wherein the at least one y-variable comprises: a first y-variable for specific fuel consumption, a second y-variable for melt rate and a third y-variable for yield.

5. The method of claim 1, wherein the at least one reference cycle for each y-variable is determined by identifying one or more best case cycles of operation of the furnace.

6. The method of claim 1, wherein the at least one reference cycle is a single best reference cycle or includes multiple best reference cycles that are defined based on the charge material to be fed to the furnace.

7. The method of claim 6, wherein each reference cycle is an average of best case cycles of furnace operation for a particular type of charge material.

8. The method of claim 1, wherein the regression model determines the relationship between x-variables and y-variables and is also used to identify insignificant x-variables so that the insignificant x-variables are removable, the insignificant x-variables being x-variables determined to have an effect that is below a pre-selected significance threshold.

9. The method of claim 1, wherein the real-time data from the sensors of the furnace include charge material data, furnace condition data and operational data.

10. The method of claim 1, comprising:
    communicating data for the adjusting operation of the furnace to a computer device of an operator so that the operation of the furnace is adjusted to converge toward the furnace performance defined by the at least one reference cycle so operation of the furnace is adjusted to converge toward a desired performance of the furnace.

11. The method of claim 1, wherein the adjusting of the operation of the furnace so that operation of the furnace is adjusted comprises:
    communicating data for the adjusting of the operation of the furnace to a first computer device operatively connected to the furnace so that the operation of the furnace is adjusted.

12. The method of claim 1, wherein the adjusting of the operation of the furnace so that operation of the furnace is adjusted to converge toward the pre-selected furnace performance defined by the at least one reference cycle includes using the calculated at least one desired cycle performance parameter value to adjust the operation of the furnace.

* * * * *